E. Dithridge,
Making Silvered Glassware.
Nº 70,325. Patented Oct 29, 1867.

Witnesses.
Jno Ellis
F Lehmann

Inventor.
E Dithridge
per
J H Alexander
atty

United States Patent Office.

EDWARD DITHRIDGE, OF PITTSBURG, PENNSYLVANIA.

Letters Patent No. 70,325, dated October 29, 1867.

IMPROVED PROCESS OF MANUFACTURING SILVERED GLASSWARE.

*The Schedule referred to in these Letters Patent and making part of the same.*

TO ALL WHOM IT MAY CONCERN:

Be it known that I, EDWARD DITHRIDGE, of Pittsburg, in the county of Allegheny, and State of Pennsylvania, have invented certain new and useful improvements in the Process for Manufacturing Silvered Glassware; and do hereby declare that the following is a full, clear, and exact description thereof, reference being had to the accompanying drawings, and to the letters of reference marked thereon, which form a part of this specification, in which—

Figure 1:
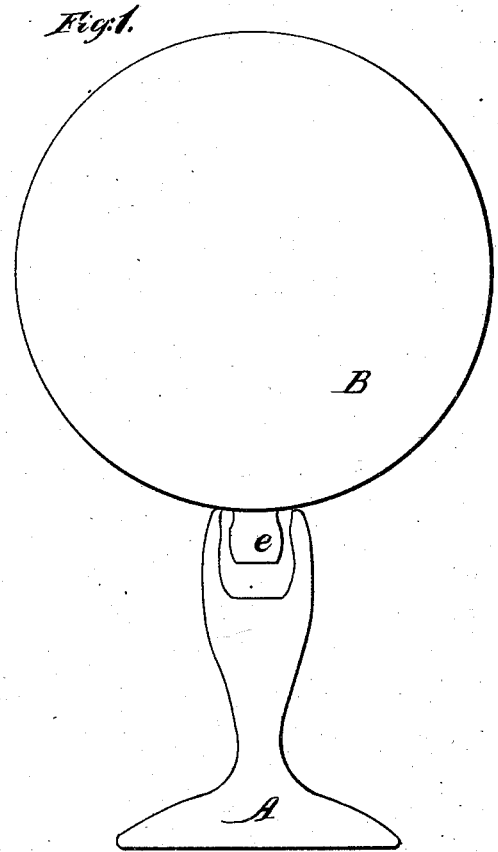
Figure 2:
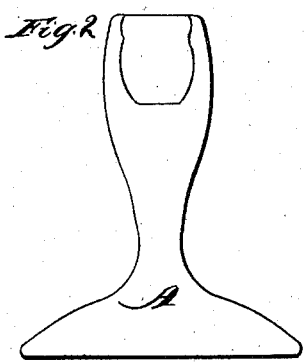

Figure 1 is an elevation, with the globe and holder or stand placed in proper relation to each other, and Figure 2 is a similar view of the holder.

The nature of my invention consists in an improved method of manufacturing glassware to be silvered, whereby the cement is prevented from coming in contact with the silver, substantially as hereinafter set forth.

A represents the stand, which should be made longer than required. It is then reheated and doubled in, so as to form a recess or receptacle for the cement, as fully seen in the drawings. A hole is left in the bottom of the stand for the introduction of the silver. In larger articles this receptacle is formed somewhat differently. A piece of molten glass is gathered on the end of the blowing pipe, and placed on the end of the article in which it is desired to produce the double part; it is then sucked in, and the cavity fashioned with the ordinary glass-blowers' tools. B represents a globe, provided with a tubular projection, e, through which the silver is inserted.

In joining the globe and stand together, place the projection e in the recess in stand A, and fill the cavity with cement. Thus it will be observed that the difficulty hitherto experienced in connecting two or more parts of silvered glassware is entirely obviated by a very simple process, as it is impossible for the cement to come in contact with the silver, and thus mar the finish of the article.

Having thus fully described my invention, what I claim, and desire to secure by Letters Patent, is—

Providing a recess for the reception of tenons, so as to form any article of silvered glassware composed of any number of pieces, without bringing the cement used in contact with the silver on the glass, substantially as set forth and described.

In testimony that I claim the foregoing as my own I affix my signature in presence of two witnesses

EDWD. DITHRIDGE.

Witnesses:
 Jos. A. BUTLER,
 E. D. DITHRIDGE.